United States Patent [19]

Nguyen et al.

[11] 4,427,506
[45] Jan. 24, 1984

[54] AC ETCHING OF ALUMINUM CAPACITOR FOIL

[75] Inventors: Trung H. Nguyen, Williamstown; John J. Randall, Jr.; Allan B. McPherson, both of North Adams, all of Mass.

[73] Assignee: Sprague Electric Company, North Adams, Mass.

[21] Appl. No.: 422,931

[22] Filed: Sep. 24, 1982

[51] Int. Cl.³ .............................. C25F 3/00; C25F 5/00
[52] U.S. Cl. .............................. 204/129.4; 204/129.75; 204/129.9; 204/129.95
[58] Field of Search ............. 204/129.4, 129.75, 129.9, 204/129.95, DIG. 2

[56] References Cited

U.S. PATENT DOCUMENTS

| | | | |
|---|---|---|---|
| 3,284,326 | 11/1966 | Martin | 204/129.75 |
| 3,321,389 | 5/1967 | Anderson | 204/129.75 |
| 3,728,237 | 4/1973 | Heijenbrok | 204/129.75 |
| 3,887,447 | 6/1975 | Sheasby et al. | 204/129.4 |
| 4,052,275 | 10/1977 | Gumbinner et al. | 204/129.95 |
| 4,276,129 | 6/1981 | Kanzaki et al. | 204/58 |
| 4,297,184 | 10/1981 | Dyer | 204/129.4 |
| 4,332,652 | 6/1982 | Arora et al. | 204/129.75 |
| 4,376,686 | 3/1983 | Arora | 204/129.85 |

FOREIGN PATENT DOCUMENTS 50-159430 12/1975 Japan.
52-133043 11/1977 Japan.

*Primary Examiner*—Howard S. Williams
*Assistant Examiner*—T. L. Williams

[57] ABSTRACT

In the AC etching of aluminum foil in a hydrochloric acid electrolyte containing at least one additive, the presence of 200 to 500 ppm sulfate permits etching thicker foil for higher voltage use than is possible without the sulfate. The additive is chosen from phosphoric, nitric, and tartaric acids or salts. The presence of the relatively small amount of sulfate yields a foil with higher capacitance and generally allows lower temperatures and frequencies to be used.

4 Claims, 1 Drawing Figure

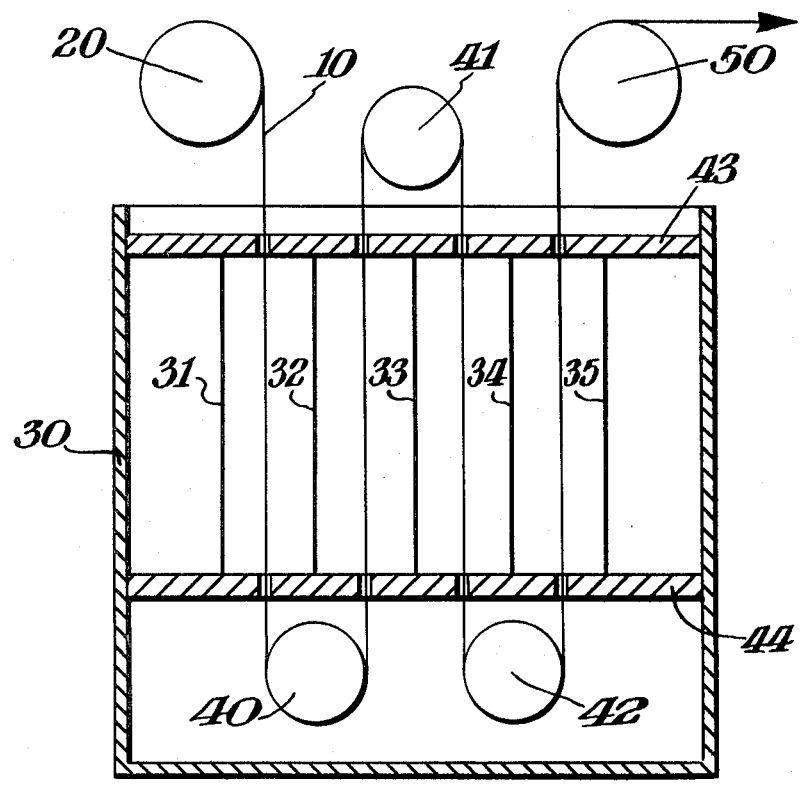

AC ETCHING OF ALUMINUM CAPACITOR FOIL

BACKGROUND OF THE INVENTION

This invention relates to the AC etching of aluminum capacitor foil in a hydrochloric acid-based electrolyte containing at least one additive and additionally 200 to 500 ppm sulfate to permit the etching of 3.0 to 5.0 mil thick foil for higher voltage use than with the same electrolyte without sulfate.

AC etching has been used to produce aluminum articles such as lithographic plates and capacitor foil. It also has been used to electropolish aluminum articles prior to metal plating.

The prior art has discussed the difficulties in obtaining an even or uniform etch structure and has overcome these difficulties in a variety of ways, e.g. interrupting the etch process to apply protective coatings, carrying out the etch process in stages of differing degrees of aggressiveness, and using additives in the electrolyte bath to control pit size or to increase mechanical strength in the foil.

Another problem has been to prevent the precipitation of aluminum hydroxide, formed during etching, on or into the etched surfaces.

The resolution of these problems has led to prior art processes in which the etch conditions are carefully controlled to provide the desired increase in surface area and, particularly for capacitor foil, with little change in mechanical strength. Such a process is described by M. R. Arora, E. J. Paquette, and A. B. McPherson in U.S. Pat. No. 4,332,652 issued June 1, 1982 which utilizes phosphoric and nitric acids in the hydrochloric acid etch bath. Another such process is described by M. R. Arora in copending U.S. Ser. No. 321,973, filed Nov. 16, 1981, now U.S. Pat. No. 4,376,686 issued Mar. 15, 1983, which utilizes nitric and tartaric acids in the hydrochloric acid etch bath.

SUMMARY OF THE INVENTION

The present invention permits the etching of both thicker (3.0 to 5 mil) aluminum capacitor electrode foils and for higher voltage use through the addition of a relatively small amount, 200 to 500 ppm, of sulfate to the etchant bath.

The prior art processes, referred to above, are satisfactory for 2.5 mil thick aluminum foil and for producing foil for capacitors in the low voltage range, e.g., about up to 60 V.

It has been found that the sulfate concentration must be controlled, as less than 200 ppm has little or no effect on the results and more than 500 ppm has a detrimental effect. Within this range, there is an optimum sulfate concentration that varies for each etchant composition.

Not only does the presence of sulfate permit the etching of thicker foils and the production of foils useable at higher voltages, but also it generally permits operation at lower optimum values of temperature, frequency, and current density than with the same etchant without the presence of sulfate.

The etchant solution also contains aluminum ions, initially added as hydrated aluminum chloride to provide an initial solution similar in concentration to that present after start-up when aluminum ions are produced by the etching process. Generally, the aluminum ion concentration is 0.2 to 0.5 M.

When phosphoric and nitric acids are used as additives, the concentration of phosphoric acid is up to 0.2 M, that of the nitric acid is up to 3.0 M, that of the hydrochloric acid is 0.5 to 1.5 M, and sulfate concentration is 200 to 500 ppm. With this electrolyte, the presence of sulfate ions permits operating at the lower end of the temperature and frequency range than that used without the presence of sulfate and also permits the etching of thicker foil than is possible with this electrolyte without sulfate.

When the electrolyte contains nitric and tartaric acids as additives, the concentration of the nitric acid is 0.1 to 0.3 M, that of the tartaric acid is 0.1 to 0.2 M, that of the hydrochloric acid is 1.0 to 1.5 M, and sulfate concentration is 200 to 500 ppm. With this electrolyte, the presence of sulfate does not change process conditions substantially but it does permit the etching of foil to much higher voltages than without the sulfate present and the etching of 3.0 to 5 mil thick foil.

When nitric acid is used as the additive, the electrolyte composition is 0.5 to 1.5 M hydrochloric acid, 0.1 to 0.3 M nitric acid and 200–500 ppm sulfate.

In all cases, the presence of the small amount of sulfate appears to prevent localized dissolution of the foil surface during etching. This random localized protection gives a more uneven surface and hence a higher surface area and higher capacitance foil. Concentrations above 500 ppm appear to give a more even film which seems to aid dissolution of the foil surface and results in macrothinning of the foil.

The temperature and frequency are related to etchant composition, but generally fall within the range of 10 to 20 Hz and 24° to 40° C. When the bath contains both phosphoric and nitric acids, the best results were obtained at about 10 to 15 Hz and 30° to 37° C. When the etchant bath contains both nitric and tartaric acids, the best results were obtained at 14 to 20 Hz and 34° to 40° C. When the bath contains nitric acid, best results are obtained at 12 to 17 Hz and 24° to 30° C.

It is desirable to etch foil of 3 to 5 mil thickness because of its greater mechanical strength and also to be able to etch it more deeply for higher voltage use without severely weakening the foil. The presence of sulfate ion in relatively small amounts in the etchant bath permits attaining both these objectives.

BRIEF DESCRIPTION OF THE DRAWING

The sole FIGURE shows foil being etched by the process of the present invention.

DESCRIPTION OF THE PREFERRED EMBODIMENTS

Aluminum foil 10 is passed over roll 20 into etching tank 30 between insulated electrodes 31 and 32, under roll 40 and between electrodes 32 and 33, over roll 41 and between electrodes 33 and 34, under roll 42 and between electrodes 34 and 35, and out of tank 30 and over roll 50. The electrodes are carried by insulated frames 43 and 44 that have openings for passage of foil 10. More electrodes and rolls may be used than shown. In fact, it is more efficient to use more electrodes, but enough have been shown to illustrate the invention.

Because the electrodes 31, 32, 33, 34 and 35 are mounted in insulated frames 43 and 44, the alternating current passed through them is forced to pass through the foil and not through the main body of etchant solution. In this way, the foil is electrochemically etched during the time the foil passes between a pair of electrodes and not electrochemically etched when outside the frame, e.g., between frame 44 and roll 40.

In the examples below, soft aluminum foil of 99.99% purity of 3.0 to 4.0 mil (0.076 to 0.102 mm) were etched according to the process of the present invention. The etching voltage, a function of etch cell design and current density, is typically $-7$ V to $+7$ V. With a different cell design, the voltage will differ also. The etching voltage also depends on the resistivity of the etchant and will vary with different etchant. In general, for every etchant, there are specific ranges of temperature, frequency, current density, and total charge passed, with the first two more closely related to etchant composition than the latter two conditions. When the composition, frequency, and temperature have been determined, etchant voltage is selected to give the desired current density and total charge. In the following examples, the current density is about 1 A/in$^2$ of foil and total charge about 750 coulombs/in$^2$ of foil.

Capacitance is that of foil anodized to the specified voltages, e.g. 30 V capacitance is the measured capacitance per square inch of a foil sample that has been anodized to 30 V at a final current density of 10 mA per 1.375 square inch of geometric foil area.

EXAMPLE 1

Soft foil (3.0 mil) was etched in the pilot plant using as electrolyte 0.9 M hydrochloric acid, 0.4 M aluminum chloride, 0.12 M nitric acid, 0.11 M phosphoric acid, and 300 ppm sulfate. The current density was 0.9 A/in$^2$. The effect of frequency and temperature on 30 V capacitance was determined.

TABLE 1

| Etch Temperature, °C. | Frequency Hz | Charge, Coulombs/in$^2$ | 30V Cap, μF/in$^2$ |
|---|---|---|---|
| 31 | 12.4 | 741 | 136 |
| 31 | 13 | 741 | 140 |
| 31 | 14 | 741 | 142 |
| 31 | 15 | 741 | 139 |
| 31 | 16 | 741 | 129 |
| 33 | 12.4 | 741 | 126 |
| 33 | 13 | 741 | 130 |
| 33 | 14 | 741 | 132.5 |
| 33 | 15 | 741 | 129 |
| 33 | 16 | 741 | 120 |
| 37 | 12.4 | 648 | 102 |
| 37 | 13 | 648 | 108 |
| 37 | 14 | 648 | 110.5 |
| 37 | 15 | 648 | 108 |
| 37 | 16 | 648 | 104 |

The results show a strong dependency on temperature and frequency.

EXAMPLE 2

Soft foil (3.0 mil) was etched in the pilot plant using approximately the same electrolyte (0.8 M hydrochloric acid, 0.4 M aluminum chloride, 0.13 M nitric acid, 0.11 M phosphoric acid) to determine the effect of sulfate concentration. Etching conditions were 31° C., 0.90 A/in$^2$, and 13.8 Hz.

TABLE 2

| Sulfate concentration ppm | Capacitance, μF/in$^2$ | | | | | |
|---|---|---|---|---|---|---|
| | 10V | 30V | 60V | 100V | 150V | 200V |
| 250 | 429 | 146.6 | 54.4 | 23.4 | 11.3 | 6.6 |
| 350 | 410 | 139.2 | 54.4 | 22.5 | 11.4 | 7.1 |
| 400 | 452 | 148.9 | 57.3 | 24.7 | 11.6 | 6.8 |
| 430 | 464 | 151.4 | 57.6 | 24.1 | 11.4 | 7.0 |

TABLE 2-continued

| Sulfate concentration ppm | Capacitance, μF/in$^2$ | | | | | |
|---|---|---|---|---|---|---|
| | 10V | 30V | 60V | 100V | 150V | 200V |
| 530 | 400 | 125.3 | 48.2 | 20.3 | 9.8 | 6.0 |

All capacitance values dropped at above 500 ppm sulfate. Examination of the foils indicated that there was less macrothinning of the foils and a deeper etch structure when sulfate was present than without it.

EXAMPLE 3

Since a deeper etch structure can be obtained with the addition of sulfate, soft 4.0 mil foil was etched in the laboratory using as electrolyte 0.9 M hydrochloric acid, 0.4 M aluminum chloride, 0.14 M nitric acid, 0.11 M phosphoric acid, and 400 ppm sulfate. The frequency was varied from 10 to 30 Hz. As will be seen below, best results were obtained at 12 to 14 Hz; results at 25 and 30 Hz followed the same trend as at 20 Hz but were lower. Current density was 1 A/in$^2$ and charge was 750 coulombs/in$^2$.

TABLE 3

| Frequency, Hz | Temperature, °C. | 30V Cap, μF/in$^2$ |
|---|---|---|
| 10 | 23.5 | 130 |
| 10 | 25 | 140 |
| 10 | 27 | 143 |
| 10 | 30 | 138 |
| 10 | 35 | 94 |
| 12 | 27 | 126 |
| 12 | 30 | 150 |
| 12 | 31 | 152 |
| 12 | 33 | 150 |
| 12 | 35 | 134 |
| 14 | 30 | 144 |
| 14 | 33 | 150 |
| 14 | 35 | 147 |
| 14 | 37 | 138 |
| 20 | 31 | 116 |
| 20 | 33 | 144 |
| 20 | 35 | 150 |
| 20 | 37 | 146 |
| 20 | 40 | 124 |

Again, there is a strong dependency on both frequency and temperature with this electrolyte. Further experimentation set the electrolyte composition range at 0.5 to 1.5 M hydrochloric acid, 0.1 to 0.3 M nitric acid, 0.1 to 0.2 M phosphoric acid, and 200-500 ppm sulfate with 300 ppm sulfate preferred. Frequencies between 10 and 15 Hz with temperatures of 25° to 40° C. (depending on frequency) are preferred also.

EXAMPLE 4

In the next series of experiments, phosphoric acid was omitted from the electrolyte in order to see if it were possible to simplify the solution. The etchant was composed of 1 M hydrochloric acid, 0.4 M aluminum chloride, 0.14 M nitric acid, and 300 ppm sulfate. Foil thickness was 4.0 mil.

TABLE 4

| Frequency, Hz | Temperature, °C. | Capacitance, μF/in$^2$ | |
|---|---|---|---|
| | | 10V | 30V |
| 12 | 24 | 515.6 | 154.2 |
| 16.4 | 27 | 520.7 | 157.3 |
| 20 | 30 | 503.3 | 145.5 |

The second sample was also anodized to 100, 150, and 180 V; the corresponding capacitance values are 20.1, 9.0, and 6.3 $\mu F/in^2$. Comparing these results with those of Table 2, it can be seen that it is feasible to eliminate phosphoric acid when sulfate is present in the electrolyte.

Further experiments have shown that the concentration of hydrochloric acid may be 0.5 to 1.5 M with 1.0 M preferred, 0.1 to 0.3 nitric acid with 0.14 M preferred, and 200-500 ppm sulfate with 300 ppm preferred. With this electrolyte, the frequency should be 12 to 17 Hz and the temperature 24° to 30° C.

EXAMPLE 5

The addition of sulfate to an electrolyte containing nitric and tartaric acids was investigated. In one experiment, both 2.6 and 3.0 mil foil was etched using 1.27 M hydrochloric acid, 0.4 M aluminum chloride, 0.1 M tartaric acid, 0.2 M nitric acid, 40° C., 16.4 Hz, and 1.1 A/in². The results are given in Table 5a.

TABLE 5a

| Sulfate concentration | Foil thickness | Capacitance, $\mu F/in^2$ | |
|---|---|---|---|
| | | 10V | 30V |
| 0 ppm | 2.6 mil | 371 | 114 |
| 0 ppm | 3.0 mil | 386 | 121 |
| 400 ppm | 2.6 mil | 403 | 131 |
| 400 ppm | 3.0 mil | 394 | 134 |

Again, the presence of sulfate gives a higher capacitance. Examination of the etched foil samples showed that with sulfate present, the foil surface remained partially intact and there was a deeper etch structure while when no sulfate was present, most of the initial foil surface was dissolved away leaving a shallower etch structure. These observations tend to reinforce the premise localized inhibition of dissolution.

In next series of experiments, the effect of sulfate concentration and frequency on capacitance was determined using 4 mil foil, 1.3 M hydrochloric acid, 0.35 M aluminum chloride, 0.2 M nitric acid, and 0.1 M tartaric acid. Etch temperature was 40° C.

TABLE 5b

| Frequency, Hz | Sulfate, ppm | Capacitance, $\mu F/in^2$ | | | |
|---|---|---|---|---|---|
| | | 10V | 30V | 90V | 150V |
| 14 | 270 | 503 | 151 | — | 11 |
| 16.4 | 270 | 476 | 160 | — | 13 |
| 14 | 360 | 476 | 160 | 32 | 14 |
| 15 | 360 | 536 | 167 | 32 | 14 |
| 17 | 360 | 487 | 163 | 32 | 14 |
| 14 | 450 | 495 | 150 | — | — |
| 16.4 | 450 | 491 | 158 | — | 14 |
| 20 | 450 | 484 | 154 | 29 | 13 |
| 14 | 665 | 458 | 138 | — | — |
| 16.4 | 665 | 482 | 148 | — | — |
| 20 | 665 | 465 | 148 | 29 | 12 |

In another series of experiments, the effect on capacitance of frequency and temperature was determined using the above electrolyte containing 350 ppm sulfate and 1.3 A/in². At 14 Hz, best 30 V capacitances of 152, 155 and 152 $\mu F/in^2$ were obtained at 34°, 36° and 38° C., respectively, while best results of 155, 157 and 155 $\mu F/in^2$ were obtained at 36°, 38°, and 39° C. for 16.4 Hz. With this etchant, the preferred temperature is 34° to 40° C. and the preferred frequency is 14 to 20 Hz. The preferred etchant composition is 1.0 to 1.5 M hydrochloric acid, 0.1 to 0.2 M tartaric acid, and 0.1 to 0.3 M nitric acid containing 200-500 ppm sulfate.

What is claimed is:

1. In a process for the etching of aluminum capacitor foil comprising passing said foil under the influence of alternating current through hydrochloric acid-based electrolyte containing at least one additive selected from the group consisting of phosphoric, nitric, and tartaric acids, the hydrochloric acid concentration being 0.5 to 1.5 M, the concentration of said additive being 0.1 to 0.3 M, the frequency of said alternating current being 10 up to 15 Hz, and the temperature being 24° to 37° C., the addition of 200 to 500 ppm sulfate to the etchant permits etching of 3.0 to 5 mil thick foil for the production of foil for higher voltage use than that obtained with the same electrolyte in the absence of sulfate.

2. A process according to claim 1 wherein said etchant is 0.5 to 1 M hydrochloric acid, 0.1 to 0.2 M phosphoric acid, 0.1 to 0.3 M nitric acid, and 200-500 ppm sulfate.

3. A process according to claim 1 wherein the etchant is 1.0 to 1.5 M hydrochloric acid, 0.1 to 0.3 M nitric acid, 0.1 to 0.2 M tartaric acid, and 200-500 ppm sulfate.

4. A process according to claim 1 wherein said etchant is 0.5 to 1.5 M hydrochloric acid, 0.1 to 0.3 M nitric acid, and 200-500 ppm sulfate.

* * * * *

UNITED STATES PATENT AND TRADEMARK OFFICE
CERTIFICATE OF CORRECTION

PATENT NO. : 4,427,506
DATED : January 24, 1984
INVENTOR(S) : Trung H. Nguyen et al It is certified that error appears in the above—identified patent and that said Letters Patent is hereby corrected as shown below:

Column 1, line 22, "in" should read -- of --
Column 2, line 1, "3.0 M" should read -- 0.3 M --
Claim 1, line 4, after "electrolyte" insert -- etchant --
Claim 2, line 2, "1 M" should read -- 1.5 M --

Signed and Sealed this

Twenty-fourth Day of April 1984

[SEAL]

Attest:

GERALD J. MOSSINGHOFF

Attesting Officer    Commissioner of Patents and Trademarks